United States Patent [19]

Starnes, Jr.

[11] 4,028,337

[45] June 7, 1977

[54] TECHNIQUE FOR STABILIZATION OF VINYL CHLORIDE POLYMERS

[75] Inventor: William Herbert Starnes, Jr., Roselle Park, N.J.

[73] Assignee: Bell Telephone Laboratories, Incorporated, Murray Hill, N.J.

[22] Filed: Mar. 24, 1976

[21] Appl. No.: 669,858

Related U.S. Application Data

[63] Continuation-in-part of Ser. No. 534,766, Dec. 20, 1974, abandoned.

[52] U.S. Cl. .................. 260/45.75 S; 260/34.2; 526/17; 526/30
[51] Int. Cl.² .................................. C08K 5/58
[58] Field of Search ............ 260/45.75 S, 79.5 NV, 260/79.5 C, 34.2; 526/17, 30

[56] References Cited

UNITED STATES PATENTS

| | | | |
|---|---|---|---|
| 2,891,922 | 6/1959 | Johnson | 260/45.75 S |
| 2,914,506 | 11/1959 | Mack et al. | 260/45.75 S |
| 3,111,506 | 11/1963 | Roussillon et al. | 526/17 |
| 3,531,453 | 9/1970 | Gaylord et al. | 526/17 |
| 3,715,333 | 2/1973 | Larkin | 260/45.75 S |
| 3,716,568 | 2/1973 | Brecker et al. | 260/45.75 S |
| 3,758,537 | 9/1973 | Wowk | 260/45.75 S |
| 3,764,571 | 10/1973 | Jennings et al. | 260/45.75 S |
| 3,772,244 | 11/1973 | Wowk | 260/45.75 S |
| 3,836,486 | 9/1974 | Hafner | 526/17 |
| 3,855,179 | 12/1974 | Wilkins et al. | 260/45.75 S |
| 3,880,803 | 4/1975 | Keizer | 260/45.7 S |
| 3,862,066 | 1/1975 | Reiter | 526/17 |
| 3,884,846 | 5/1975 | Otsuki et al. | 526/17 |

OTHER PUBLICATIONS

American Chemical Society, Division of Polymer Chemistry Polymer Preprints, Mar. 1971, vol. 12, No. 1, pp. 795–803.

*Primary Examiner*—Ronald W. Griffin
*Attorney, Agent, or Firm*—Edward M. Fink

[57] ABSTRACT

A technique is disclosed for the preparation of stable vinyl chloride polymers which are substantially free of heavy metal residues. The technique involves reacting a vinyl chloride polymer in solution with an organotin compound, precipitating the polymer from solution and subjecting it to solvent extraction.

9 Claims, 1 Drawing Figure

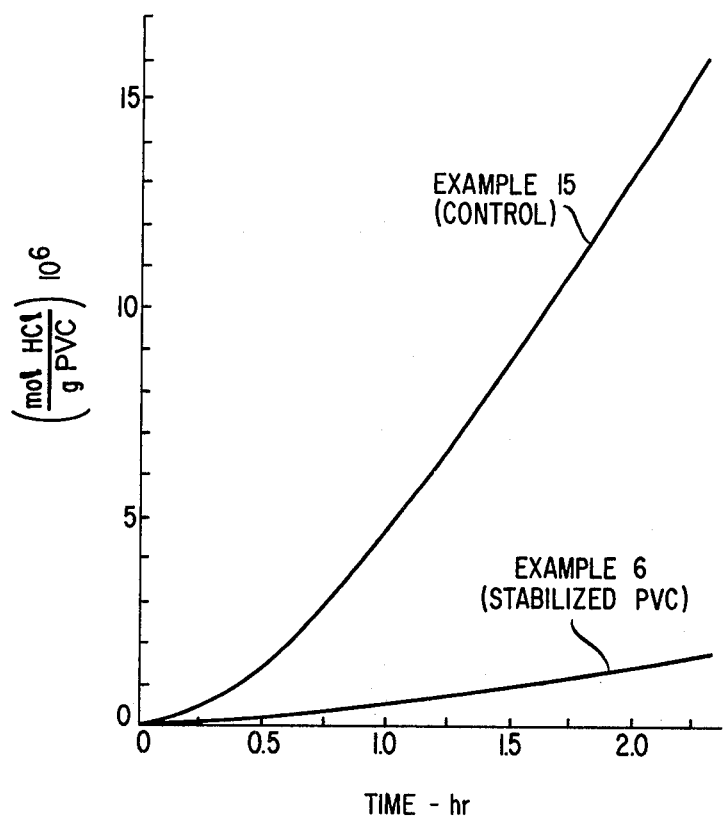

TECHNIQUE FOR STABILIZATION OF VINYL CHLORIDE POLYMERS

This application is a continuation-in-part of my co-pending application, Ser. No. 534,766, filed Dec. 20, 1974, now abandoned.

This invention relates to a technique for the preparation of stabilized vinyl chloride polymers. More particularly, the present invention relates to the preparation of vinyl chloride polymers stabilized against nonoxidative degradation by reaction with an organotin compound.

Vinyl chloride polymers and copolymers are known to deteriorate under the influence of heat, so resulting in alteration of the physical properties thereof and discoloration which precludes use in lightly colored or transparent articles. This thermal, nonoxidative degradation involves the sequential loss of hydrogen chloride from adjacent monomer units and results in the formation of conjugated polyene structures which impart undesirable color to the vinyl chloride polymer.

Efforts to obviate these limitations have typically involved the use of stabilizing compositions of the $MY_2$ type wherein M is a metallic cation, for example, $R_2Sn^{+2}$, (R is usually an alkyl group), $Ba^{+2}$, $Cd^{+2}$, $Zn^{+2}$, $Pb^{+2}$, $Ca^{+2}$ etc., and Y is an organic anion. The most effective stabilizers from this class of compounds are the organotin compounds, particularly those containing tin-sulfur bonds. It has been theorized that these $MY_2$ stabilizers react with hydrogen chloride and since hydrogen chloride is known to catalyze polyvinyl chloride (PVC) degradation, the efficacy of these stabilizers is due, in part, to hydrogen chloride scavenging. However, these stabilizers are also believed to have the ability to undergo rapid and selective metathetical reactions which destroy certain polyvinyl chloride structural anomalies that are the active degradation sites. Accordingly, in addition to reducing the rate of color development in polyvinyl chloride by interrupting the growth of polyenes, the $MY_2$ stabilizers should manifest a true chemical stabilization effect by reducing the rate of formation of total chloride. However, true chemical stabilization of polyvinyl chloride by the use of $MY_2$-type organotin stabilizers has not been conclusively demonstrated in the prior art.

Despite conflicting theories advanced by workers in the art, relative to the described stabilization mechanism, the $MY_2$ stabilizers and, particularly, the organotin mercaptides have been used extensively in industry. Although considered satisfactory from the standpoint of stabilization, toxicity of the heavy metal residues and ecological considerations have stimulated further evaluation of such compositions and generated a search for alternative approaches.

In accordance with the present invention, this end has been attained by means of a novel process which yields a polymeric product that is free from the toxic heavy metal containing residues characteristic of the prior art. Additionally, the vinyl chloride polymers prepared in accordance with the invention evidence greatly enhanced stability with respect to the unstabilized composition and which is comparable to that provided by most prior art stabilizers for vinyl chloride polymers.

Briefly, the present invention involves heating a vinyl chloride polymer sample in solution with an organotin compound, precipitating the vinyl chloride polymer from the reaction product and subjecting the resultant precipitate to solvent extraction to remove residual heavy metal-containing species.

The invention will be more readily understood by reference to the following detailed description taken in conjunction with the accompanying drawing wherein:

The Figure is a graphical representation on coordinates of time in hours against hydrogen chloride evolution showing degradation of an unstabilized PVC sample and one stabilized in accordance with the invention. The vinyl chloride polymers described herein are prepared by reacting the polymer in solution with an organotin compound of the general formula

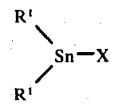

wherein $R^1$ is a hydrocarbon radical having from 1–8 carbon atoms and -X is a radical selected from the group consisting of a) 

and
b)  $—S(CH_2)_nCOO—$ wherein $R^2$ is selected from the group consisting of (1) straight chain hydrocarbon radicals having from 1–18 carbon atoms and (2) $CH_2COOR^3$, $R^3$ being a straight chain hydrocarbon radical having from 1–8 carbon atoms and $n$ is an integer from 1–8. Compositions found to be particularly useful for this purpose are di(n-butyl) tin bis(n-dodecylmercaptide), di(n-butyl)-tin S,S'-bis (isooctyl mercaptoacetate), di(n-butyl)tin β-mercaptopropionate, etc. The organotin compound is employed in an amount ranging from 1–8 grams per gram of vinyl chloride polymer, the minimum and maximum values being dictated by practical considerations relating to the efficacy of stabilization.

As noted, reaction is effected in solution, a large excess of stabilizer being employed to assure active site destruction. The solvent selected must readily dissolve vinyl chloride polymer and should evidence a boiling point in excess of 160° C. Organic solvents suitable for this purpose include o-dichlorobenzene, ethyl benzoate, methyl benzoate and the like.

In the operation of the process, the reaction mixture comprising vinyl chloride polymer (obtained from commercial sources and having an average molecular weight ranging from 30,000–100,000) in solution and from 1–8 grams of organotin mercaptide per gram of polymer (an excess well beyond stoichiometry) is heated to a temperature within the range of about 160°–185° C for a time period ranging from about 76 to 18 hours, the longer time periods corresponding with the lower temperature and the converse. However, use of the longer time periods with the higher reaction temperatures does not have an adverse effect upon the results. The solvent employed tends to eliminate stabilizer dispersion difficulties encountered in solid phase system and the excess stabilizer enhances the rate of active site destruction by a mass action effect. The reaction is found to be accelerated by the use of from 0.67–2.7 grams per gram of vinyl chloride polymer of a catalyst, typically in organotin salt, as for example, di (n-butyl)tin dichloride. Lastly, reaction is desirably effected in the presence of a nonreactive or inert gas, argon, nitrogen, neon and the like being found suitable for such purposes.

Following, the reaction mixture is cooled and the vinyl chloride polymer precipitated therefrom. Cooling is continued until a temperature less than the boiling point of the solvent selected for use in the precipitation process is attained. Solvents suitable for this purpose include the lower alkanols containing from 1–6 carbon atoms, as for example, methanol, ethanol and isopropanol. The solvent is added to the reaction mixture until such time as no further polymer precipitation is observed. The filtrate produced in this operation comprises orthodichlorobenzene and a plurality of tin species, as well as other soluble by-products formed during the reaction.

The polymer recovered, containing physically occluded tin, is then subjected to a conventional solvent extraction operation utilizing any of the lower alkanols ($C_1$–$C_6$) as the solvent. Conveniently, this process is effected with hot alkanol over a 24 hour period. Finally, the recovered vinyl chloride polymer is dried and analyzed.

The basic aspects of the invention having been described, reference is made to the following illustrative embodiments. It will be appreciated by those skilled in the art that such embodiments are for purposes of exposition only and are not to be construed as limiting.

EXAMPLE I

The stabilization process was effected in a three-necked round bottom flask heated by a thermostatically controlled oil bath equipped with a reflux condenser connected to a pressure release valve, a ground glass stopper and an inert gas fritted disc bubbler.

Di(n-butyl)tin bis(n-dodecylmercaptide) was added to o-dichlorobenzene 100 ml/gram of polymer and the mixture stirred rapidly while admitting argon into the system and adjusted to a temperature of approximately 183° C (by means of the oil bath) during a one hour period. Following, the flask was unstoppered and vinyl chloride polymer admitted to the system in an amount sufficient to yield a mixture containing 8.0 grams of stannane per gram of vinyl chloride polymer. Complete dissolution of the polymer occurred within five minutes. The reaction mixture was heated at 183° C for 19 hours and then cooled to a temperature of approximately 60° C with continued introduction of inert gas. The reaction product was next poured into methanol (2.33 ml/ml of o-dichlorobenzene) to yield a heterogeneous mixture which was vigorously agitated through the course of the addition. After several minutes of stirring, the precipitated vinyl chloride polymer was recovered by suction filtration and washed several times on the fritted glass filter with fresh methanol. The polymer was then subjected to Soxhlet extraction with hot methanol for 24 hours and dried over-night prior to analysis. The rate constant of polyvinyl chloride dehydrochlorination under argon was then determined and found to be $4.1 \times 10^{-6}$ mols of hydrogen chloride per gram of polyvinyl chloride per hour at 160.5° C.

The dehydrochlorination was carried out in a glass reaction vessel, the vinyl chloride polymer being admitted thereto in powder form in a thin uniform layer. The vessel was initially degassed by passing argon therethrough for 20 minutes at room temperature and the vessel subsequently immersed in a thermostated oil bath previously adjusted to the desired dehydrochlorination temperature. Gas exiting from the reactor was bubbled through a capillary tube into a magnetically stirred vessel containing distilled water, the pH of the water being continuously monitored. A time period of 15 minutes was allowed for thermal equilibration and kinetic points were taken at appropriate intervals by titrating the dissolved hydrogen chloride with 0.0100 N sodium hydroxide solution. The plot of amounts of added caustic against time showed autoacceleration initially and then linearity. The value of the rate constant was then calculated from the straight line fitted to the linear portion of the curve by visual inspection.

The procedure of Example I was repeated varying the amount and nature of additive, reaction time and reaction temperature. The results are set forth in the following Table.

| Example | Additives (g/g of PVC) | Reaction Temperature, ° C | Reaction Time, Hr. | Tin, ppm | $\left(\dfrac{\text{mol HCl}}{\text{g PVC} - \text{Hr}}\right)10^6$ |
|---|---|---|---|---|---|
| 1 | $Bu_2Sn(DM)_2(8.0)$ | 183 | 19 | <1 | 4.1 |
| 2 | $Bu_2Sn(DM)_2(2.0)$ | 184 | 19 | 16 | 6.0 |
| 3 | $Bu_2Sn(DM)_2(2.0)$ $Bu_2SnCl_2(0.67)$ | 183 | 19 | <2 | 3.5 |
| 4 | $Bu_2Sn(DM)_2(8.0)$ $Bu_2SnCl_2(0.67)$ | 183 | 19 | 50 | 3.3 |
| 5 | $Bu_2Sn(DM)_2(8.0)$ $Bu_2SnCl_2(2.7)$ | 184 | 19 | 7 | 2.5 |
| 6 | $Bu_2Sn(DM)_2(2.0)$ $Bu_2SnCl_2(0.67)$ | 185 | 75 | 68 | 0.95 |
| 7 | $Bu_2Sn(DM)_2(2.0)$ $Bu_2SnCl_2(0.67)$ | 163 | 75 | 7 | 2.2 |
| 8 | $Bu_2Sn(DM)_2(2.0)$ $Bu_2SnCl_2(0.67)$ | 165 | 19 | 26 | 7.6 |
| 9 | $Bu_2Sn(DM)_2(2.0)$ $Bu_2SnCl_2(0.67)$ | 132 | 75 | 49 | 7.4 |
| 10 | $Bu_2Sn((IMA)_2(2.0)$ $Bu_2SnCl_2(0.67)$ | 184 | 19 | 9 | 5.3 |
| 11 | $Bu_2Sn(IMA)_2(2.0)$ $Bu_2SnCl_2(0.67)$ | 184 | 75 | <4 | 1.8 |
| 12 | $Bu_2Sn(BMP)(1.1)$ $Bu_2SnCl_2(0.67)$ | 188 | 38 | 54 | 2.1 |
| 13 | $Bu_2Sn(BMP)(1.1)$ $Bu_2SnCl_2(0.67)$ | 182 | 75 | 45 | 0.88 |
| 14 | Control (no Additive) | 184 | 19 | | <48 |
| 15 | Control (no Additives, No | | | | 8.2 ± 0.5* |

| Example | Additives (g/g of PVC) | Reaction Temperature, °C [a] | Reaction Time, Hr. | Tin, ppm | $\left(\dfrac{\text{mol HCl}}{\text{g PVC} - \text{Hr}}\right)10^6$ |
|---|---|---|---|---|---|
| | Heat Treatment | | | | |

[a] ± 3°
[b] Average of several runs
Bu₂Sn(DM)₂ = Di(n-butyl)tin bis(n-dodecyl mercaptide)
Bu₂Sn(IMA)₂ = Di(-n-butyl)tin S,S'-bis(isooctyl mercaptoacetate)
Bu₂Sn(BMP) = Di(n-butyl)tin β-mercaptopropionate Analysis of the results set forth in the Table reveal that the desired chemical stabilization is achieved. It is noted that the results obtained in Examples 1–13 lead to the conclusion that the overall rate of the net chemical process leading to destruction of degradation sites is greater than the rate of the net process leading to active site creation. Example 14 is a control experiment in which organotin compounds are not added to the vinyl chloride polymer which is heated in an o-dichlorobenzene solution to a temperature of 184° C for a time period of 19 hours. As noted, the stabilization effect is nil. Example 15 relates to a control in which no additives or heat treatment are given to the vinyl chloride polymer.

With reference now to the Figure, there is shown a graphical representation on coordinates of time in hours against the rate of degradation ×10⁶ for the control of Example 15 and for Example 6. It will be noted that the rate of degradation of significantly greater for the unstabilized sample.

What is claimed is:

1. Technique for preparing a stable vinyl chloride polymer which comprises removing heavy metal residues by solvent extraction from the product formed by reaction of a vinyl chloride polymer and from 1–8 grams of an organotin compound per gram of polymer in a solvent at a temperature within the range of 160°–185° C for a time period within the range of 76–18 hours, the shorter time periods corresponding with the higher temperatures and the converse, the organotin compound being of the formula

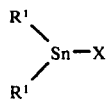

wherein R¹ is a straight chain hydrocarbon radical having from 1–8 carbon atoms and —X is a radical selected from the group consisting of a)

and
b)     —S(CH₂)ₙCOO— wherein R² is selected from the group consisting of straight chain hydrocarbon radicals having from 1–8 carbon atoms and —CH₂COOR³ wherein R³ is a hydrocarbon radical having from 1–8 carbon atoms, n being an integer from 1–8, the solvent being capable of dissolving vinyl chloride polymers and evidencing a boiling point in excess of 160° C.

2. Technique in accordance with claim 1 wherein said organotin compound is di(n-butyl)tin bis (n-dodecyl mercaptide).

3. Technique in accordance with claim 1 wherein said organotin compound is di(n-butyl)tin β-mercaptopropionate.

4. Technique in accordance with claim 1 wherein said organotin compound is di(n-butyl)tin S,S'-bis-(isooctyl mercaptoacetate).

5. Technique in accordance with claim 1 wherein said vinyl chloride polymer has an average molecular weight within the range of 30,000 to 100,000.

6. Technique for preparing a stable vinyl chloride polymer which comprises the steps of
 a. reacting a vinyl chloride polymer having an average molecular weight within the range of 30,000 to 100,000 in solution with from 1–8 grams of an organotin compound per gram of polymer at a temperature within the range of 160°–185° C for a time period within the range of 76–18 hours, the shorter time periods corresponding with the higher temperatures and the converse,
 b. precipitating the polymer from the resultant reaction product with a precipitation agent, and
 c. subjecting the resultant precipitate to solvent extraction to remove heavy metal, said organotin compound being of the general formula

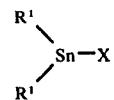

wherein R¹ is a straight chain hydrocarbon radical having from 1–8 carbon atoms and —X is a radical selected from the group consisting of a)

and
b)     —S(CH₂)ₙCOO— wherein R² is selected from the group consisting of straight chain hydrocarbon radicals having from 1–18 carbon atoms and —CH₂COOR³ wherein R³ is a hydrocarbon radical having from 1–8 carbon atoms, n being an integer from 1–8.

7. Technique in accordance with claim 6 wherein the precipitation agent and the solvent employed in the solvent extraction process is an alkanol having from 1–6 carbon atoms.

8. Technique in accordance with claim 6 wherein a catalyst is employed in said reaction.

9. Technique in accordance with claim 8 wherein said catalyst is di(n-butyl)tin dichloride.

* * * * *